United States Patent
Kato et al.

(10) Patent No.: US 7,260,052 B2
(45) Date of Patent: Aug. 21, 2007

(54) INFORMATION RECORDING MEDIUM

(75) Inventors: Masahiro Kato, Saitama (JP); Tatsuhiro Yone, Saitama (JP); Atsushi Yamaguchi, Saitama (JP); Eiji Muramatsu, Saitama (JP); Shoji Taniguchi, Saitama (JP); Toshihiko Takishita, Yamanashi (JP); Seiro Oshima, Yamanashi (JP); Takao Tagiri, Yamanashi (JP)

(73) Assignee: Pioneer Corporation, Tokyo (JP)

( * ) Notice: Subject to any disclaimer, the term of this patent is extended or adjusted under 35 U.S.C. 154(b) by 735 days.

(21) Appl. No.: 10/701,077

(22) Filed: Nov. 5, 2003

(65) Prior Publication Data

US 2004/0141454 A1  Jul. 22, 2004

(30) Foreign Application Priority Data

Nov. 5, 2002  (JP) .............................. 2002-320706

(51) Int. Cl.
*G11B 7/24* (2006.01)
(52) U.S. Cl. ................................ 369/275.3; 369/275.4
(58) Field of Classification Search .. 369/275.1–275.5, 369/44.26, 47.1, 13.55, 272, 277–279, 44.37, 369/44.13; 428/64.4
See application file for complete search history.

(56) References Cited

U.S. PATENT DOCUMENTS

| | | | | |
|---|---|---|---|---|
| 6,477,136 B2 * | 11/2002 | Sakurai et al. | ........... | 369/275.4 |
| 6,683,844 B2 * | 1/2004 | Kuroda | ..................... | 369/275.2 |
| 6,687,214 B2 * | 2/2004 | Kato et al. | ............... | 369/275.4 |
| 6,741,548 B2 * | 5/2004 | Muramatsu et al. | ..... | 369/275.4 |
| 6,807,144 B2 * | 10/2004 | Kim et al. | ............... | 369/275.4 |
| 6,847,604 B2 * | 1/2005 | Ueki | ....................... | 369/275.4 |
| 6,930,969 B2 * | 8/2005 | Yamaguchi et al. | ..... | 369/59.23 |
| 6,952,393 B2 * | 10/2005 | Muramatsu et al. | ..... | 369/275.4 |

\* cited by examiner

*Primary Examiner*—Ali Neyzari
(74) *Attorney, Agent, or Firm*—Sughrue Mion, PLLC

(57) ABSTRACT

A groove track and a land track are alternately and spirally formed on an information recording medium. On the land track neighboring the groove track, pre-information indicating position information of a track on a disc is formed as a prepit. On the information recording medium, an embossed area is formed so that information about a copyright and for preventing an illegal copy cannot be rewritten. In the embossed area, an embossed configuration including a pit and a space of predetermined depths is formed. The prepit in the embossed area is formed so that the prepit has an optimized configuration according to a pit length and a space length in the embossed area which the prepit neighbors. Consequently, interference between the embossed configuration and the prepit can be prevented even in a case that the prepit is formed in addition to the embossed configuration in the embossed area.

4 Claims, 14 Drawing Sheets

(IN CASE THAT LPP IS LOCATED NEXT TO PIT)

| | Pit length [T] | | | | | | | | | | | |
|---|---|---|---|---|---|---|---|---|---|---|---|---|
| | 3 | 4 | 5 | 6 | 7 | 8 | 9 | 10 | 11 | | | 14 |
| LPP shift [μm] | 0.16 | 0.16 | 0.16 | 0.16 | 0.16 | 0.16 | 0.16 | 0.16 | 0.16 | | | 0.16 |
| LPP depth [nm] | 55 | 63 | 69 | 73 | 75 | 76 | 77 | 77 | 77 | | | 77 |
| Distortion on RF | 0 | 0 | 0 | 0 | 0 | 0 | 0 | 0 | 0 | | | 0 |
| LPP level | 0.096 | 0.095 | 0.094 | 0.092 | 0.091 | 0.090 | 0.090 | 0.090 | 0.090 | | | 0.090 |

(IN CASE THAT LPP IS LOCATED NEXT TO SPACE)

| | Space length [T] | | | | | | | | | |
|---|---|---|---|---|---|---|---|---|---|---|
| | 3 | 4 | 5 | 6 | 7 | 8 | 9 | 10 | 11 | 14 |
| LPP shift [μm] | 0.16 | 0.16 | 0.16 | 0.16 | 0.16 | 0.16 | 0.16 | 0.16 | 0.16 | 0.16 |
| LPP depth [nm] | 47 | 44 | 42 | 40 | 39 | 39 | 39 | 39 | 39 | 39 |
| Distortion on RF | 0 | 0 | 0 | 0 | 0 | 0 | 0 | 0 | 0 | 0 |
| LPP level | 0.095 | 0.099 | 0.100 | 0.100 | 0.100 | 0.100 | 0.100 | 0.100 | 0.100 | 0.110 |

INFORMATION RECORDING MEDIUM

BACKGROUND OF THE INVENTION

1. Field of the Invention

The present invention relates to an information recording medium such as a CD and a DVD.

2. Description of Related Art

There is known a disc such as a CD-R (Compact Disc-Recordable), a DVD-R (a DVD-Recordable) and a DVD-RW (a DVD-Re-recordable) as an information recording medium on which information is recordable and rewritable.

A groove track (a track for recording) slightly wobbled in a disc radial direction is preformed on those discs in order to record information in an unrecorded area. The groove track is formed on the disc, according to a wobble signal produced by frequency-modulating a carrier having a predetermined frequency by using pre-information indicating position information of the track on the disc.

In order to extract the wobble signal from the groove track, a reflected light from the groove track of an irradiated optical beam is received by a photodetector divided into two detecting elements with a parting line optically parallel with a tangential direction of the groove track, and a differential signal of the outputs from those two detecting elements is produced and supplied to a BPF (Band Pass Filter) having the above-mentioned predetermined frequency as a center frequency.

The disc is rotation-controlled so that an average frequency of the wobble signal extracted via the BPF is equal to the above-mentioned predetermined frequency. The wobble signal thus extracted (hereafter, it is called "extracted wobble signal") is utilized as a reference signal for generating a recording clock signal. Namely, the extracted wobble signal is a continuous signal having a frequency component which is synchronized with the rotation of the disc, and the recording clock signal which is accurately synchronized with the rotation of the disc is generated by generating the clock signal synchronized, in phase, with the continuous signal.

In addition to the wobbled groove track, so-called prepits are formed on a land track neighboring the groove track at a predetermined interval. Since the prepit is formed on the land track, it is also called "Land Pre-Pit" and "LPP", and the prepit is sometimes called "LPP" in this specification. The prepit is also utilized for phase-adjustment of the recording clock signal, which is generated from the extracted wobble signal. Since the prepit is preformed at the predetermined interval in an information recording area on the disc, an information recording and reproducing apparatus generates the recording clock signal based on the extracted wobble signal, and at the same time, the apparatus adjusts the phase of the recording clock signal based on a detecting result of the prepit. In that way, the information recording and reproducing apparatus generates the accurate recording clock signal in order to record information on the disc and performs information recording based on the signal.

In some discs, the groove tracks for recording information are formed discontinuously (intermittently) in the lead-in area in which the information including the information about a copyright and the information for preventing an illegal copy is recorded. This area is sometimes called "embossed area". Namely, though the groove track is continuously formed in a data area for recording information, the groove track is discontinuously formed in the above area within the lead-in area. As a result, the configuration of the disc surface is such that convex and concave portions are repeatedly formed.

As to an unrecorded disc such as a DVD-RW, the important information such as information for preventing the illegal copy is recorded in advance in an embossed area in the lead-in area, and needless to say, the information is readable. However, since the groove tracks for recording are intermittently formed in the embossed area, even when the predetermined information is recorded in order to illegally re-write such information, the re-written information cannot be reproduced correctly. In that way, the important information as to preventing the illegal copy and the like is prevented from being re-written.

Next, a recording format of the DVD-RW will be concretely described. FIG. 1A schematically shows a cross section of the DVD-RW, and a lead-in area 51, a data area 52 and a lead-out area 53 are provided from inside to outside of the disc. The lead-in area 51 is the area in which various control information and management information are recorded, and the data area 52 is the area in which video information and the other recording information are recorded. The lead-out area 53 is the area which prescribes the outermost portion of the data area 52.

FIG. 1B shows a more detailed data configuration of the lead-in area 51. The lead-in area 51 includes, from inside of the disc to outside, an initial zone 511, a buffer zone 512, an RW physical format information zone 513, a reference code zone 514, a buffer zone 515, a control data zone 516 and an extra border zone 519.

The control data zone 516 includes a control data block 517 located inner side and a servo block 518 located outer side thereof. Inner side of the control data zone 516 is an embossed area in which the embossed pits are intermittently (discontinuously) formed in a circumference direction (the tangential direction) of the disc on the groove track for recording the information.

It is noted that, in most discs, embossed pits readable as an RF signal are formed in the control data block 517, and embossed pits unreadable as the RF signal are formed in the servo block 518. Thus, the control data block 517 and the servo block 518 are respectively expressed as a readable embossed area 517 and an unreadable embossed area 518 for convenience afterward.

In the readable embossed area 517, control data such as information about the copyright and information for preventing the illegal copy is pre-recorded before the shipment of the disc from a factory. The control data is recorded as the deep embossed pits which can be read out by the recording and reproducing apparatus of the optical disc. However, since the embossed pits are intermittently formed in the readable embossed area 517, the control data cannot be read out correctly even though the data is rewritten. As a result, illegal rewriting of the control data can be prevented. It is noted that the prepits are not formed on a land track L in the readable embossed area 517 in most DVD-RWs.

On the other hand, unreadable embossed pits are formed in the unreadable embossed area 518 in order to prevent reading out the information which is rewritten and recorded in the area. In most DVD-RWs, the embossed pits formed in the unreadable embossed area 518 are shallower than the embossed pits formed in the readable embossed area 517. Also, the prepits are formed on the land track L in the unreadable embossed area 518 as well as on the land track in the data area. It is noted that the prepits in the unreadable embossed area 518 are formed in order to establish clock synchronization for writing the information in the extra border zone 519 following the unreadable embossed area 518. When the information is written on the DVD-RW, the information is recorded based on the recording clock signal which is generated from the extracted wobble signal and the detection signal of the prepit. However, since the prepits are formed discontinuously, the recording clock signal having an accurate phase cannot be generated without reading the area of the DVD-RW for a certain length to read out plural prepits.

On the other hand, in order to record the information in the extra border zone 519, the accurate recording clock signal has to be generated at the head of the extra border zone 519. So, the plural prepits are detected in the unreadable embossed area 518, which is formed just in front of the extra border zone 519, and the accurate recording clock signal is generated. In that way, when a light beam for recording arrives at the head of the extra border zone 519, the accurate recording clock signal has already been generated.

In this view, in the unreadable embossed area 518, no information is recorded, and the prepits are merely formed according to the predetermined rule. Thus, the recording and reproducing apparatus generates the recording clock signal of the accurate phase, which is described below, by reading out the prepits in the unreadable embossed area 518 to record the information in the extra border zone 519 based on the recording clock signal.

As described above, no prepit is formed in the readable embossed area in the control data zone because the embossed pits and the prepits interfere with each other in the embossed area, and in many cases, neither the embossed pits nor the prepits can be read out correctly. This is why the unreadable embossed area which follows the readable embossed area is formed on purpose to read out the prepits.

However, as to the unreadable embossed area, conditions for manufacturing are strict. Concretely, some conditions have to be satisfied at the same time, e.g., (1) making it possible that the prepit signal is accurately read out by keeping the level of the prepit signal, (2) making it possible that a push-pull signal is accurately output in order to execute tracking control by a recording apparatus, (3) making it possible that a DPD (Differential Phase Detection) signal, which is one of tracking servo systems in the DVD-ROM, is accurately output in order to execute the tracking control by a reproducing apparatus. So, in the unreadable embossed area, the pit deeper than the groove and shallower than the embossed pit is formed on the disc so that each level of the prepit signal, the push-pull signal and the DPD signal satisfies a standardized value. Thus, very precise adjustment is needed in cutting.

In addition, if such a new format that the ROM area is formed for some purposes inside the disc of the DVD-RW, in addition to the control data zone is proposed, the unreadable embossed area has to be formed after the readable embossed area, i.e., the ROM area, without exception, like the case of the above-mentioned control data zone. The unreadable embossed area, as described above, is formed in order to generate the recording clock for the following recording area, and hence no information can be recorded therein. Namely, recording capacity of the disc is decreased by the quantity of the unreadable embossed area thus formed.

SUMMARY OF THE INVENTION

The present invention has been achieved in order to solve the above problems.

According to one aspect of the present invention, there is provided an information recording medium on which grooves and prepits neighboring the groove are formed, wherein the groove includes an embossed area in which an embossed configuration including pits and spaces of predetermined depths is formed; and wherein the prepit in the embossed area has an optimized configuration according to a length of the pit or the space which the prepit neighbors.

The optimized configuration may be prescribed by a prepit shift which indicates a length of the prepit in a perpendicular direction to a direction of the length of the groove and by a depth of the prepit. In an embodiment, the prepit shift may be determined to be constant for all the lengths of the pit or the space in the embossed area; and the depth of the prepit may be determined according to the length of the pit or the space in the embossed area. In a preferred embodiment, the optimized configuration of the prepit may be a configuration with which an RF signal distortion caused by the prepit becomes minimum.

According to the present invention, a groove track and a land track are alternately and spirally formed on the information recording medium. The information recording medium includes an optical disc such as a DVD-RW. The groove track serves as a track for forming the pit corresponding to the recording information. The pre-information which indicates the position information of the track on the disc is formed as the prepits on the land track neighboring the groove track. Since the prepit is formed on the land track, it is also called "land prepit (LPP)".

On the information recording medium, the embossed area is formed so that the control data such as information about the copyright and information for preventing the illegal copy is recorded in an un-rewritable manner. In the embossed area, the embossed configuration which includes the pits and spaces of the predetermined depth is formed. (In a sense that the pits and the spaces are formed in the embossed area, they are particularly called "embossed pit" and "embossed space".) The recording data in the embossed area is readable by the recording and reproducing apparatus of the optical disc. However, even though the recording data is rewritten, the data cannot be read correctly because the embossed pits are intermittently formed in the embossed area. As a result, illegal rewriting of the control data can be prevented.

According to the present invention, the prepits in the embossed area are formed to have the optimized configuration according to the embossed pit length or the embossed space length which the prepit neighbors. Thereby, even when the prepit is formed in the embossed area in addition to the embossed configuration, interference between the embossed configuration and the prepit can be prevented. The optimized prepit configuration is the configuration in which the distortion included in the RF signal obtained from a read-out signal of the prepit portion is minimum, i.e., the distortion becomes almost zero.

More concretely, the optimization of the prepit configuration formed in the embossed area can be achieved by optimizing the prepit shift and the prepit depth. The prepit shift indicates a prepit length (or a prepit width) in the perpendicular direction to the length direction of the groove track, i.e., in the disc radial direction. Namely, if the prepit is formed by optimizing the prepit shift and the prepit depth according to the embossed pit length or the embossed space length, the interference between the embossed configuration and the prepit can be prevented.

In a preferred example of the optimization, the prepit depth can be set to the optimum value according to the embossed pit length or the embossed space length, with the prepit shift being set to a fixed value regardless of the embossed pit length and the embossed space length. Since it is sufficient that only the prepit depth is controlled at the time of forming the prepits on the disc, this example has such an advantage that the disc manufacturing is comparatively easy.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

[Disc Configuration]

Figure 1A:
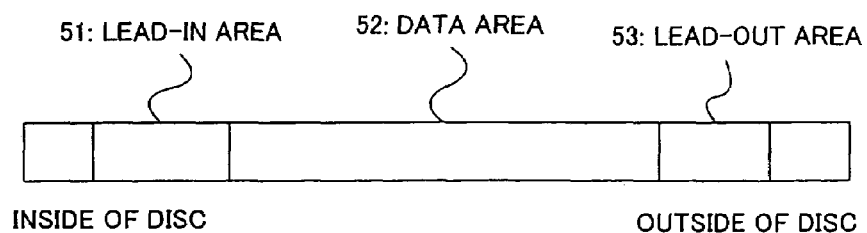
FIGS. 1A and 1B are diagrams showing a recording format of a DVD-RW disc.
Figure 1B:
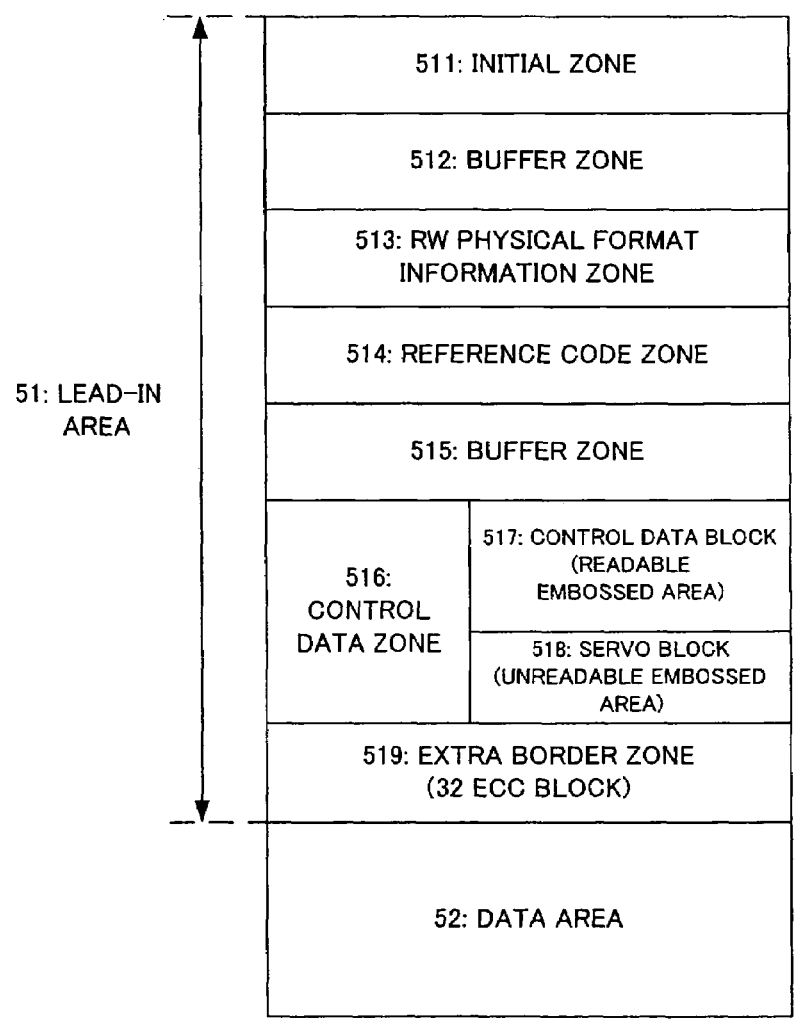
Figure 2:
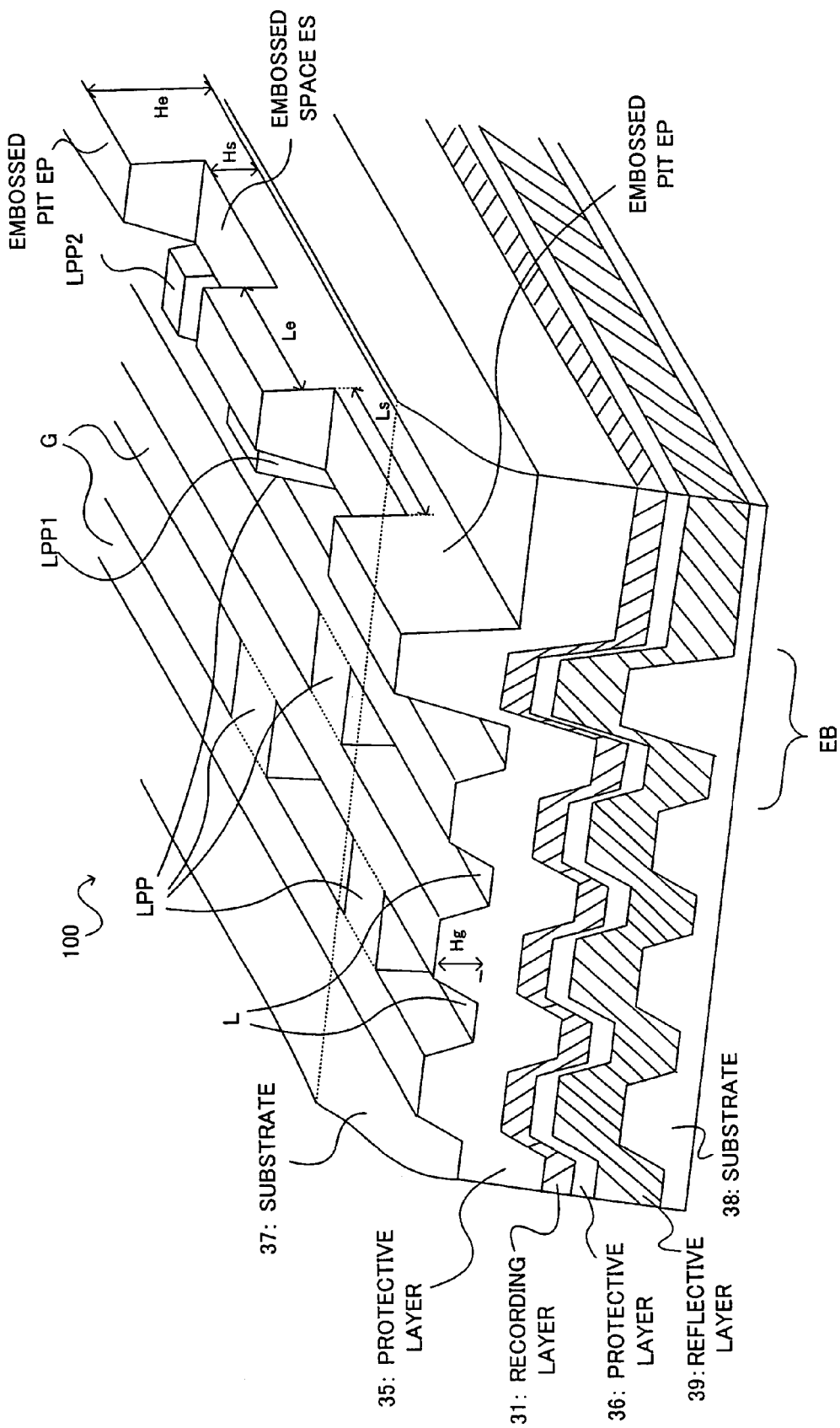
FIG. 2 is a diagram showing a forming condition of a pit in a DVD-RW according to the preferred embodiment of the present invention.

FIG. 2 shows a configuration of the DVD-RW which is an embodiment of the recording medium in the present invention. It is noted that a portion of the DVD-RW in FIG. 2 is drawn by a perspective diagram seen from a recording surface side of the disc in order to make the configuration clear.

In FIG. 2, a DVD-RW 100, which includes a recording layer 31 serving as a data recording layer, is a rewritable phase-change-type disc. On the disc substrate of the DVD-RW 100, a groove track G, which serves as the guide track for guiding a beam such as a laser beam, is formed. The data is recorded on the groove track G. The area between neighboring groove tracks G is called land track L. On the land track L, the land prepit (LPP) which corresponds to the pre-information is formed. The LPP is preformed before shipment of the DVD-RW 100.

The groove track G and the land track L are formed on a polycarbonate substrate 37. Under the polycarbonate substrate 37 in FIG. 2, respectively from upper to lower, a protective layer 35, a recording layer 31, a protective layer 36, a reflective layer 39 and a substrate 38 exist.

In a readable embossed area EB shown in FIG. 2, an embossed pits EP are formed on the groove track G, and the LPPs are formed on the land track L. The area between embossed pits forms an embossed space ES. In the recording medium in the present invention, whose details are described below, by optimizing the configuration of the LPP according to the embossed pit length and the embossed space length, it is possible that the LPPs are also formed in the readable embossed area EB.

More specifically, as shown in FIG. 2, the embossed pits EP and the embossed spaces ES are alternately formed on the groove track G in the readable embossed area EB. It is noted that the embossed pit length and the embossed space length are respectively indicated as Le and Ls. The LPPs are formed on the land track L in the readable embossed area EB. The LPP may be formed neighboring the embossed pit EP or the embossed space ES. In FIG. 2, the LPP1 is an example of the LPP which is formed neighboring the embossed pit EP, and the LPP2 is the example of the LPP which is formed neighboring the embossed space ES. It is noted that the depth Hs (the height in case of FIG. 2) of the embossed space ES in the readable embossed area EB is equal to the depth Hg of the groove track G in the data area.

While it is not shown in FIG. 2 for the sake of convenience, as to the DVD-RW 100, the groove track G is wobbled at the frequency corresponding to a rotational speed of the disc. The groove track G thus wobbled is preformed, similarly to the LPP, before the shipment of the DVD-RW 100.

In recording the recording information on the DVD-RW 100, the DVD-RW 100 is rotated at predetermined rotating speed by extracting a wobbling frequency of the groove track G by the information recording and reproducing apparatus which is described below. The "recording information" is the information to be recorded such as the video information, other than the pre-information. Also, the pre-information is obtained in advance by detecting the LPPs, and the optimum output of the light beam serving as a recording light is set based on the information. At the same time, address information indicating the position of the DVD-RW 100 at which the recording information is recorded is obtained, and the recording information is recorded in a corresponding recording position based on the address information.

As to the names of the groove track G and the land track L, a concave portion seen from the substrate 37 serving as a base is called the groove track G, and a convex portion seen from the substrate 37 is called the land track L.

[LPP Signal and RF Signal]

The present invention is characterized in that the configuration or shape of the LPP is optimized according to the embossed pit length and the embossed space length in order to enable the embossed pit and the LPP coexist in the readable embossed area without interfering with each other. Before explaining the method of the optimization, the LPP signal and the RF signal will be explained.

Figure 3:
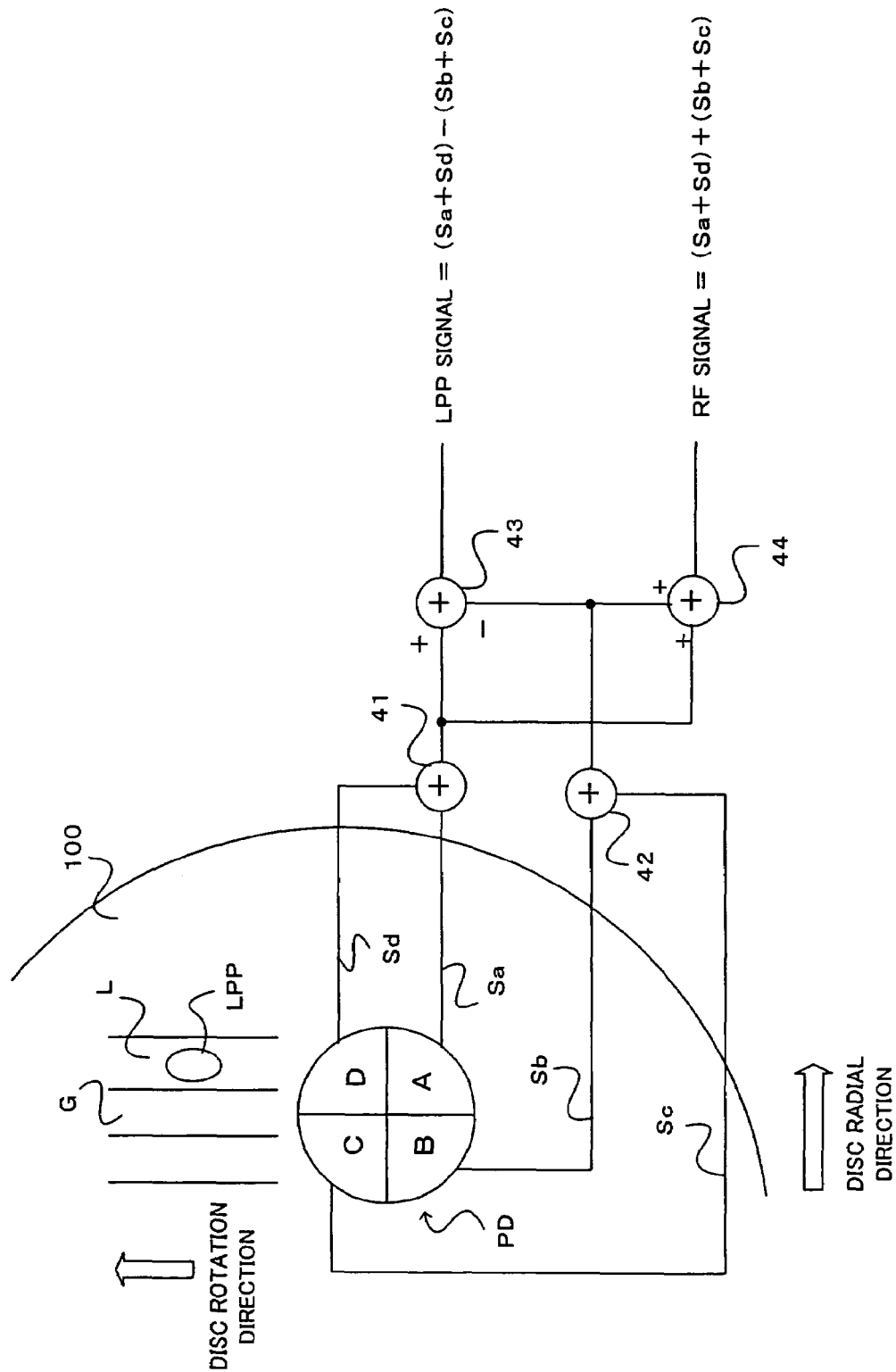
FIG. 3 is a diagram schematically showing a method of generating an LPP signal and an RF signal.

FIG. 3 schematically shows relation between a disc 100 on which the LPPs are formed and the LPP signal. On the recording surface of the disc 100 such as a DVD-R and a DVD-RW, the groove G and the land L are alternately and spirally formed. The groove G works as a recording track for recording the information, and the land L is formed between the neighboring grooves G. On the land L, the LPP is formed according to the predetermined rule. Concretely, the address information on the disc 100, corresponding to a certain groove G, is recorded in the LPP which is formed on the land outside of the groove G.

The LPP can be detected by a quadruple photodetector PD shown in FIG. 3. The quadruple photodetector PD has four detection elements A to D which output detection signals Sa to Sd obtained by photo-electronic conversion of a light receiving quantity from the disc. The detection signals Sa to Sd output from the detection elements A to D are operated by three adders 41 to 43, and the LPP signal is generated. The LPP signal is given by the following equation.

$$\text{LPP signal} = (Sa+Sd) - (Sb+Sc) \quad (1)$$

The quadruple photodetector is installed in a pickup of an information recording apparatus or an information reproducing apparatus. The LPP signal, which is a prepit signal indicating an existence of the LPP, is obtained by performing the operation according to the equation (1) using the detection signals Sa to Sd under the condition that the boundary between the detection elements A, D and the elements B, C of the quadruple photodetector PD traces the center of the recording track (groove) G by the tracking servo device provided in the information recording apparatus or the information reproducing apparatus.

The LPP can exist on the lands inside and outside the recording track G. According to the equation (1), an LPP which is located outside the recording track G is detected as a negative detection signal, and an LPP which is located inside the recording track G is detected as a positive detection signal.

On the other hand, the RF signal is the signal of the recording information recorded on the disc 100. Concretely, the RF signal is obtained by the existence of the recording pit (recording mark) formed on the disc 100. As shown in FIG. 3, the RF signal is given by the following equation.

$$\text{RF signal} = (Sa+Sd) + (Sb+Sc) \quad (2)$$

As understood from the equation (1), the LPP signal can be obtained by the push-pull signal (radial push-pull signal) in the radial direction of the quadruple photodetector PD. The RF signal is the sum total of the detection signal Sa to Sd which are output from the detection elements A to D of the quadruple photodetector.

[Optimizing Configuration of LPP]

Next, the description will be given of the method of optimizing the configuration of the LPP according to the embossed pit length and the embossed space length in order to enable the embossed pits and the LPPs coexist in the readable embossed area without interfering with each other. As described above, the embossed pit EP in the readable embossed area is the pit in which the information such as the information for preventing the illegal copy is recorded. So it is needed that the RF signal at the accurate level according to the embossed pit EP is obtained in order to correctly read out the embossed pit EP. On the other hand, it is needed that the LPP signal at the accurate level according to the LPP is obtained in order to correctly read out the LPP. Thus, it is needed that both the RF signal and the LPP signal maintain the accurate levels in the area in which the LPP is formed neighboring the embossed pit EP in order to read out the embossed pit and the LPP without interfering with each other.

Figure 4A:
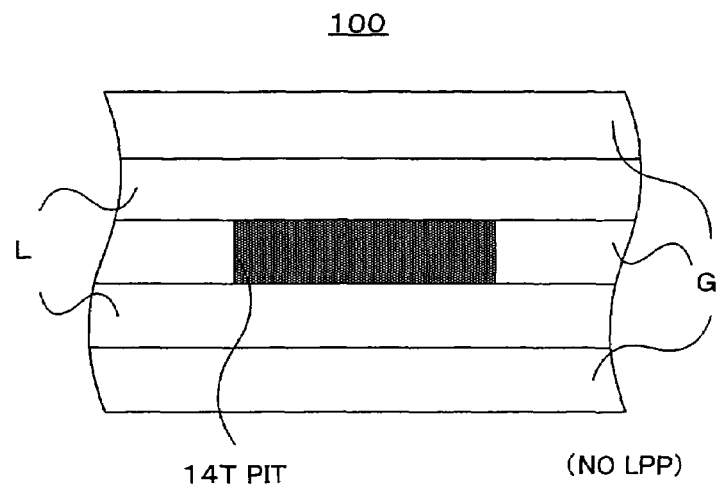
FIGS. 4A to 4C show a pit forming condition on a disc, an RF signal waveform and an LPP signal waveform in a case that an LPP is not formed neighboring an embossed pit.
Figure 4B:
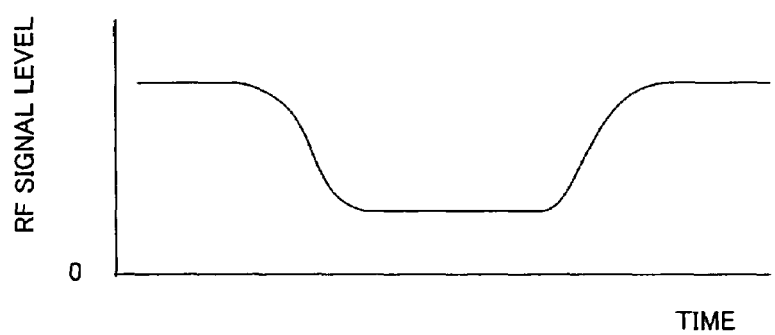
Figure 4C:
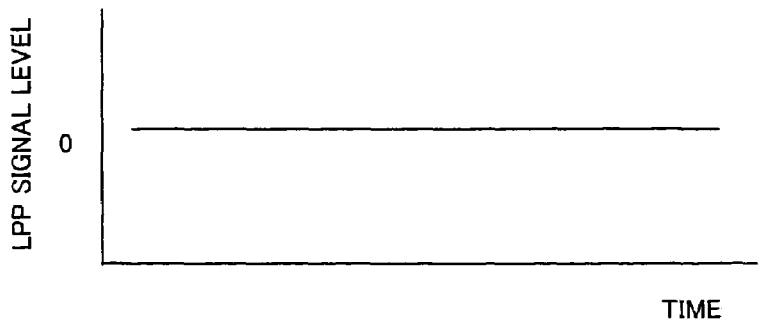

First of all, it is assumed that only the embossed pit is formed without the LPP. FIG. 4A schematically shows the portion of the DVD-RW 100 on which the 14 T pit is formed as the embossed pit EP, and FIGS. 4B and 4C respectively show waveforms of the RF signal and the LPP signal. As understood from each waveform, in a case that the LPP is not formed, the RF signal indicates the accurate level according to the embossed pit, and the LPP signal level maintains zero because the interference does not naturally occur between the LPP and the embossed pit.

Figure 5A:
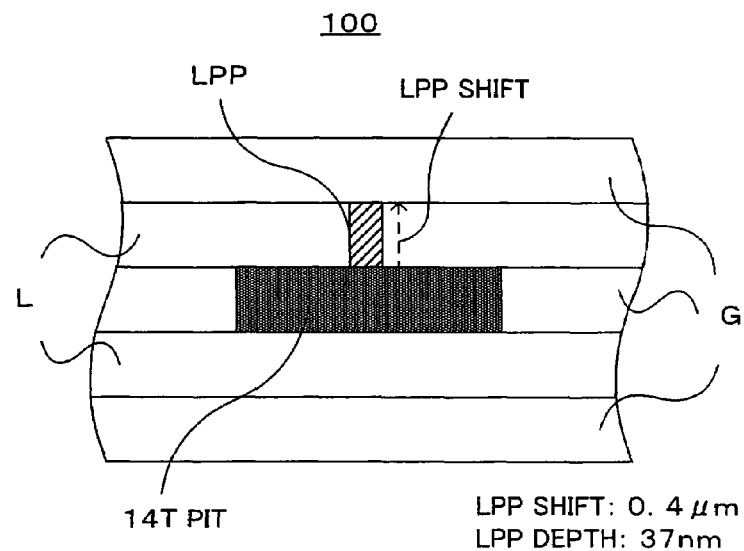
FIGS. 5A to 5C show a pit forming condition on a disc, an RF signal waveform and an LPP signal waveform in a case that an LPP is formed neighboring an embossed pit.
Figure 5B:
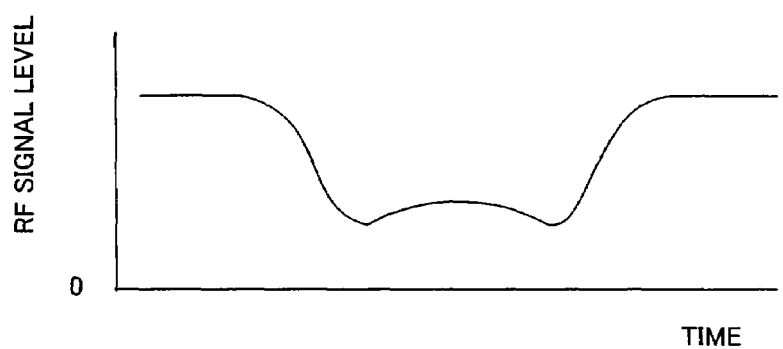
Figure 5C:
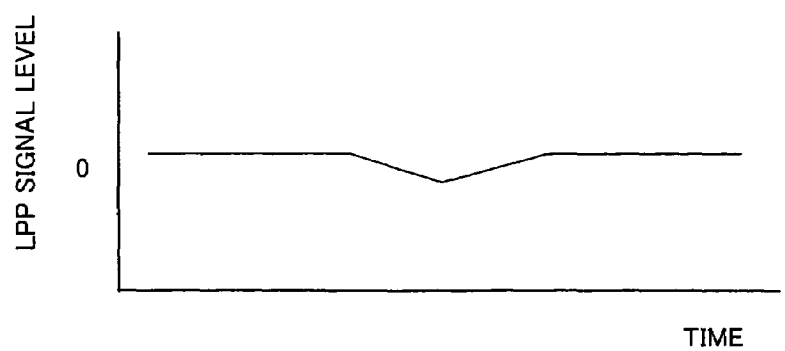

Next, FIGS. 5A to 5C show the example of a case that the LPP is formed neighboring the identical embossed pit. FIG. 5A schematically shows the area in which the LPP is formed neighboring the embossed pit, and FIGS. 5B and 5C respectively show the waveforms of the RF signal and the LPP signal. It is prescribed that the LPP depth is 37 nm, and the LPP shift quantity (i.e., the length in the disc radial direction of the LPP) is 0.4 μm. In this case, though the LPP signal is correctly obtained as shown in FIG. 5C, the RF signal level is partly increased because the level is affected by the LPP as shown in FIG. 5B.

Figure 6A:
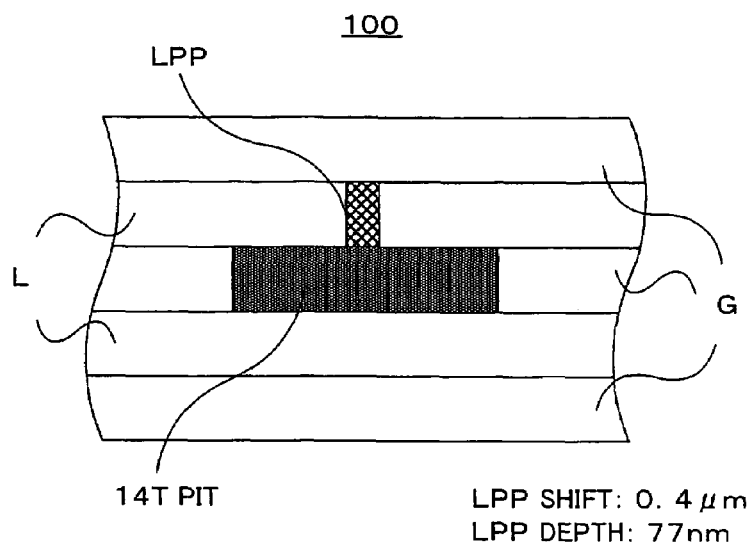
FIGS. 6A to 6C show a pit forming condition on a disc, an RF signal waveform and an LPP signal waveform in another case that an LPP is formed neighboring an embossed pit.
Figure 6B:
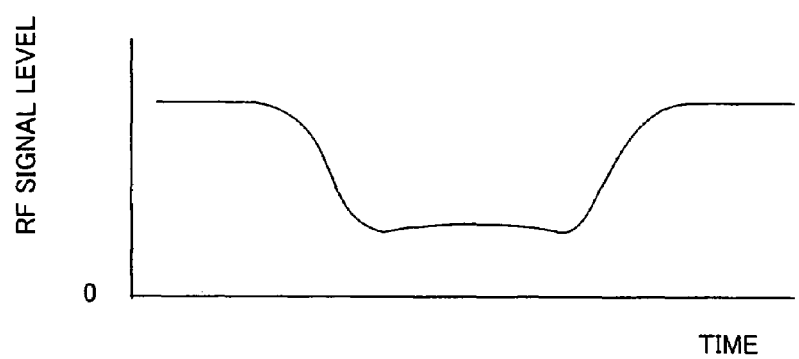
Figure 6C:
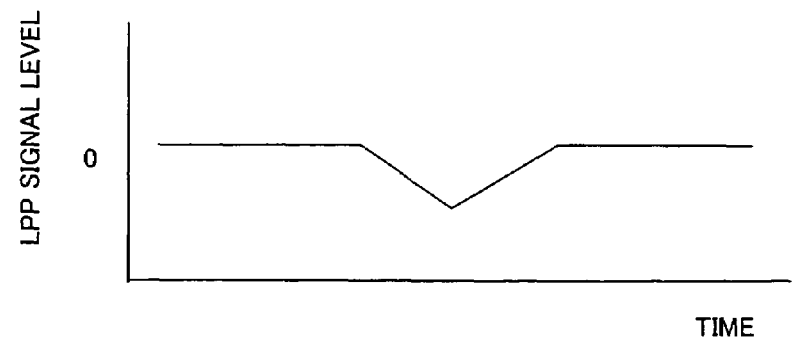

Next, FIGS. 6A to 6C show a case that the LPP depth is varied with the LPP formed in the same manner as in FIGS. 5A to 5C. FIG. 6A schematically shows the area in which the LPP is formed to the embossed pit, and FIGS. 6B and 6C respectively show the waveforms of the RF signal and the LPP signal. It is noted that the LPP depth is varied to 77 nm though the LPP shift is identical to FIGS. 5A to 5C, as to the formed LPP. In this case, as shown in FIG. 6C, the LPP signal level indicates the existence of the LPP more clearly according to the increase of the LPP depth. By comparing FIG. 6B with FIG. 5B, it is clear that, as the LPP depth is increased, the degree of the influence which the LPP gives the RF signal level is decreased.

Figure 7A:
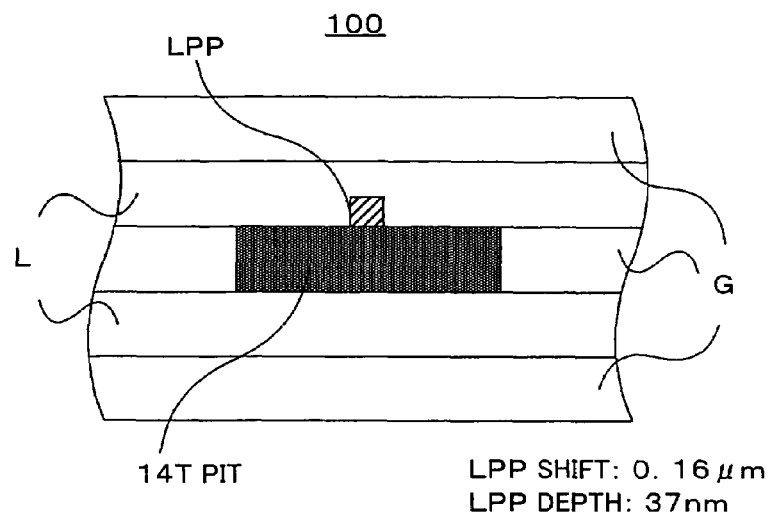
FIGS. 7A to 7C show a pit forming condition on a disc, an RF signal waveform and an LPP signal waveform in still another case that an LPP is formed neighboring an embossed pit.
Figure 7B:
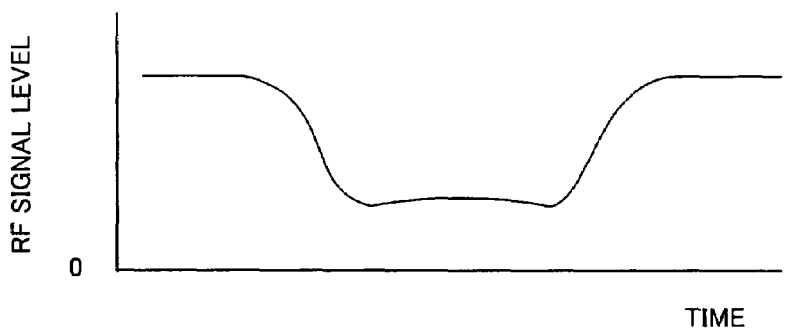
Figure 7C:
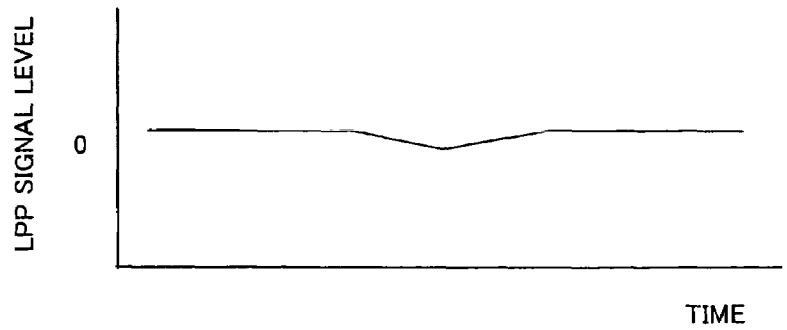

Next, FIGS. 7A to 7C show a case that the LPP shift is varied with maintaining the LPP depth identical to the cases of FIGS. 5A to 5C. FIG. 7A schematically shows the area in which the LPP is formed by prescribing that the LPP shift is 0.16 μm and the LPP depth is 37 nm. FIGS. 7B and 7C respectively show the waveforms of the RF signal and the LPP signal. By comparing with FIGS. 5A to 5C, it is clear that, as the LPP shift is decreased with the LPP depth maintained, the degree of the influence of the LPP which is given to the RF signal level is also decreased. As a result, the LPP signal can be correctly obtained, though amplitude becomes small.

Figure 8A:
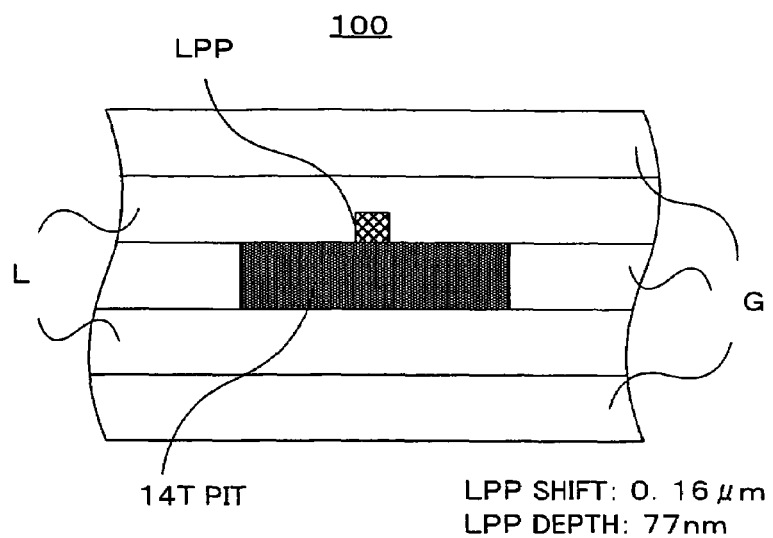
FIGS. 8A to 8C show a pit forming condition on a disc, an RF signal waveform and an LPP signal waveform in still another case that an LPP is formed neighboring an embossed pit.
Figure 8B:
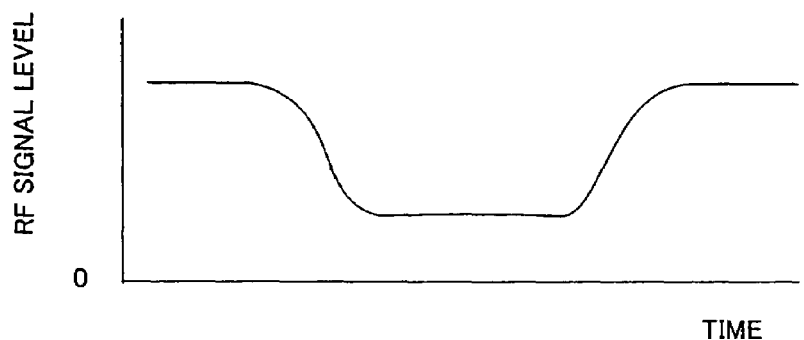
Figure 8C:
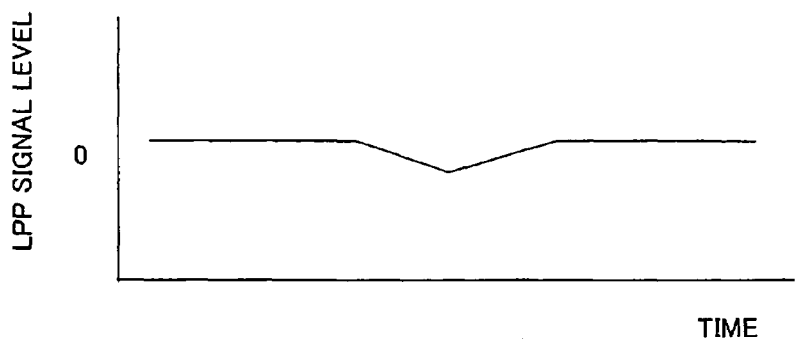

Next, FIGS. 8A to 8C show the case that the LPP shift is decreased to 0.16 μm, and the LPP depth is increased to 77 nm. FIG. 8A schematically shows the area of the LPP then, and FIGS. 8B and 8C respectively show the waveforms of the RF signal and the LPP signal. As understood by comparing FIGS. 8A to 8C with FIGS. 7A to 7C, the distortion occurring in the RF signal, which is caused by the LPP, is decreased by making the LPP depth larger, and the LPP signal level is also increased.

By the above comparisons, it is understood that the RF signal and the LPP signal can be correctly obtained by optimizing the LPP shift and the LPP depth. Namely, the interference between the embossed pit and the LPP can be decreased as much as possible. More concretely, it is found that the influence (the distortion quantity) which the LPP gives the waveform of the RF signal can be suppressed by making the LPP shift smaller. It is also found that the LPP signal can be kept at the preferred level without making the influence, which the LPP gives the waveform of the RF signal, so larger, by making the LPP depth larger.

Figure 9:
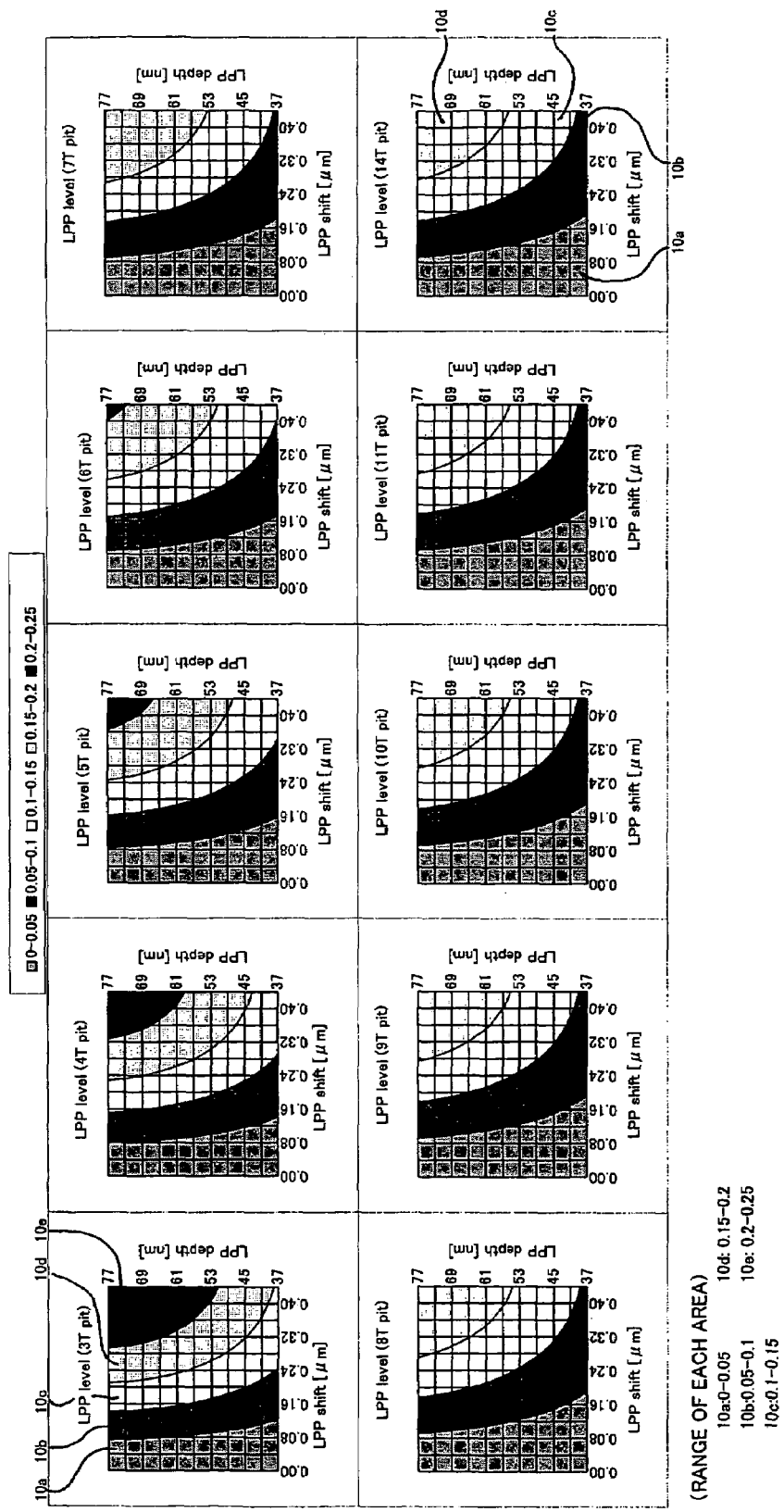
FIG. 9 is a group of graphs showing variations of an LPP signal level for each embossed pit length in a case that an LPP is formed neighboring an embossed pit with varying an LPP shift and an LPP depth.
Figure 10:
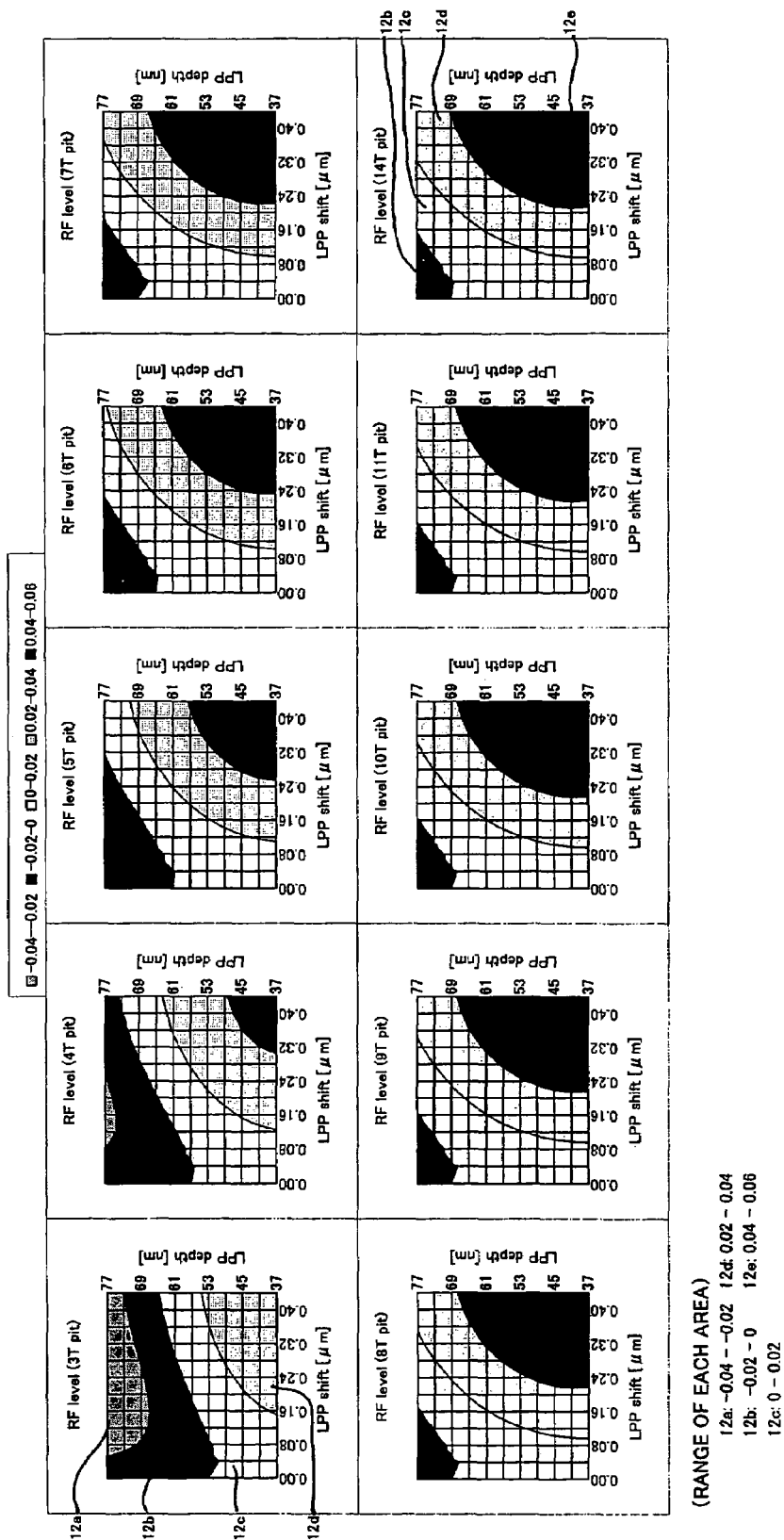
FIG. 10 is a group of graphs showing variations of an RF signal distortion quantity for each embossed pit length in a case that an LPP is formed neighboring an embossed pit with varying an LPP shift and an LPP depth.

Next, the relation between the embossed pit length and the embossed space length will be explained. The above explanation is directed to the case that the LPP shift and the LPP depth are varied for the embossed pit whose length is 14 T. In fact, since the embossed pit and the embossed space may be at any length of 3 T to 11 T and 14 T, the interference between the embossed pit or the embossed space and the LPP has to be prevented in a case that the LPP is formed neighboring each embossed pit length or the embossed space. So, it is simulated how the distortion quantities of the LPP signal level and the RF signal are varied by varying the LPP shift and the LPP depth for each embossed pit length and embossed space length. FIG. 9 and FIG. 10 show simulation results of a case that the LPP is formed neighboring the embossed pit, and FIG. 11 and FIG. 12 show the simulation results of the case that the LPP is formed neighboring the embossed space.

FIG. 9 is a group of contour maps showing the variations of the LPP signal level which is obtained by varying the LPP shift and the LPP depth, for the embossed pits of 3 T to 11 T and 14 T. Namely, the LPP signal level which is obtained at the length of each embossed pit of 3 T to 11 T and 14 T are classified into an area 10a (0 to 0.05), an area 10b (0.05 to 0.1), an area 10c (0.1 to 0.15), an area 10d (0.15 to 0.2), and an area 10e (0.2 to 0.25), and the values in these areas are shown by the contour maps. For convenience of the illustration, the reference numerals 10a to 10e indicating the areas are shown only for the lengths of the embossed pits of the 3 T and 14 T.

FIG. 10 is a group of the contour maps showing the variations of the RF signal distortion quantity which is obtained by varying the LPP shift and the LPP depth, for the embossed pits of 3 T to 11 T and 14 T. Namely, the RF signal distortion quantity which is obtained at the length of each embossed pit of 3 T to 11 T and 14 T are classified into an area 12a (−0.04 to −0.02), an area 12b (−0.02 to 0), an area 12c (0 to 0.02), an area 12d (0.02 to 0.04) and an area 12e (0.04 to 0.06), and the values in these areas are shown by the contour maps. For convenience of the illustration, the reference numerals 12a to 12e indicating the areas are shown only for the lengths of the embossed pits of the 3 T and 14 T.

Figure 11:
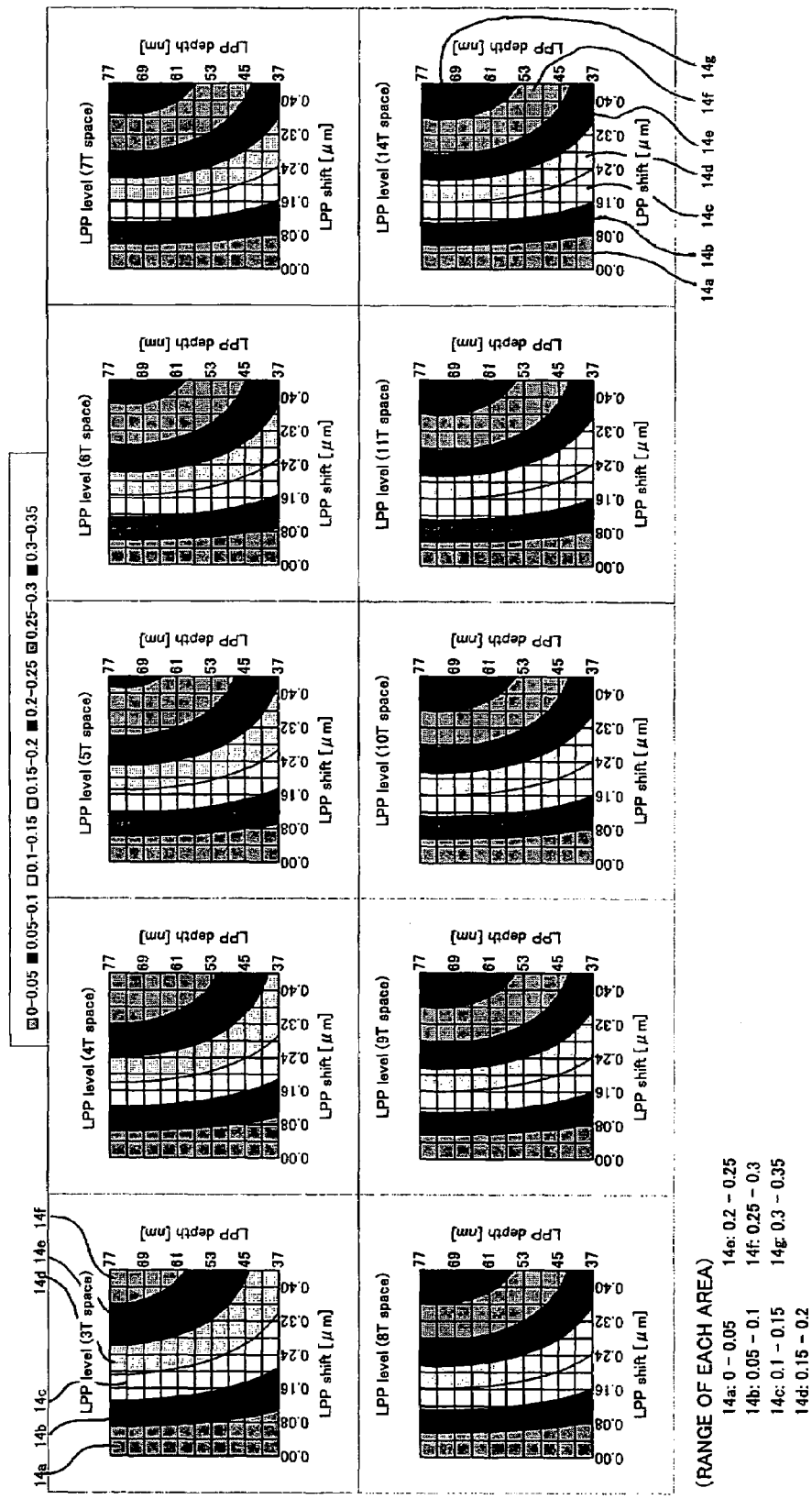
FIG. 11 is a group of graphs showing variations of an LPP signal level for each embossed space length in a case that an LPP is formed neighboring an embossed space with varying an LPP shift and an LPP depth.
Figure 12:
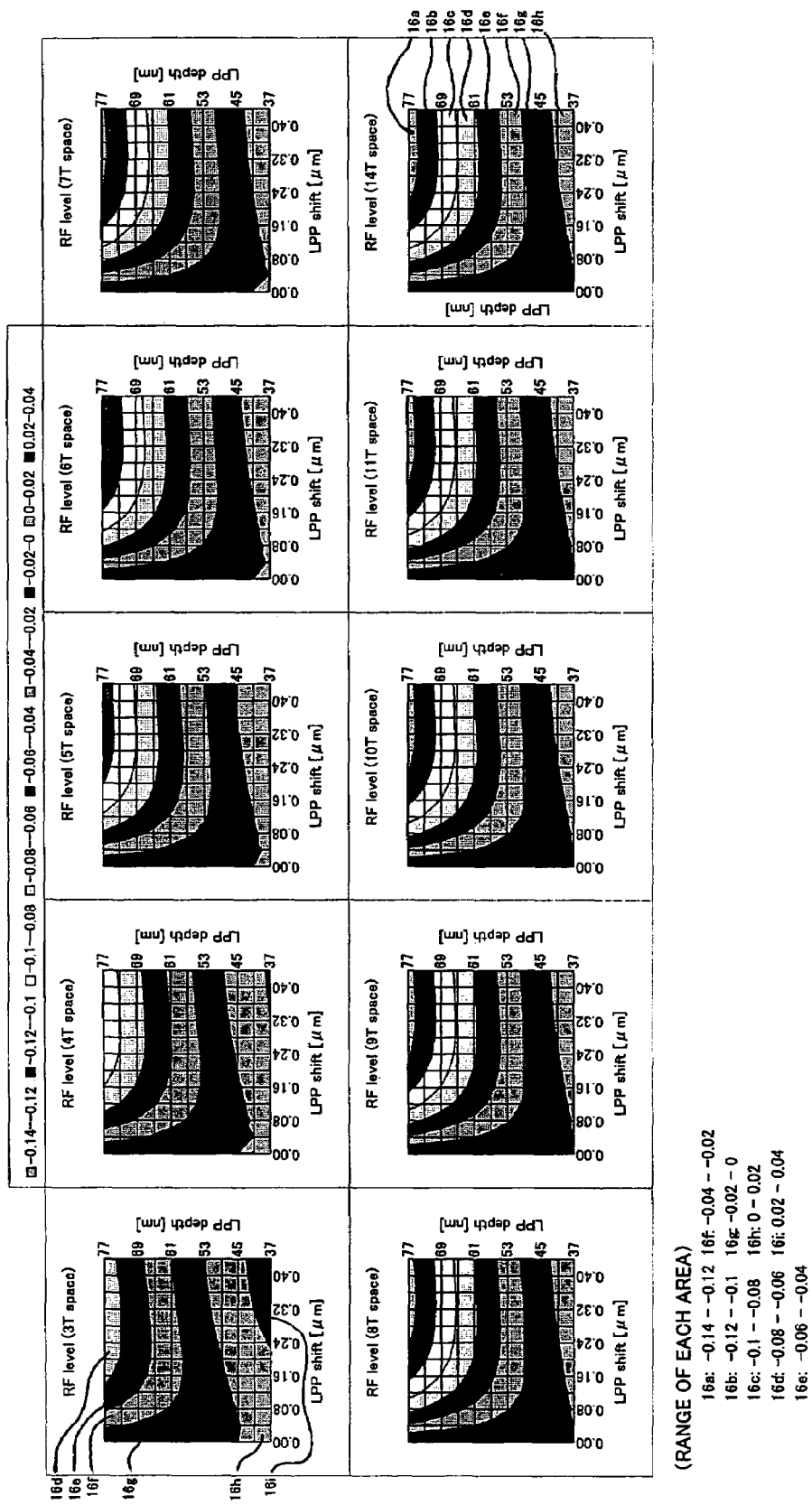
FIG. 12 is a group of graphs showing variations of an RF signal distortion quantity for each embossed space length in a case that an LPP is formed neighboring an embossed space with varying an LPP shift and an LPP depth.

FIG. 11 is a group of the contour maps showing the variations of the LPP signal level which is obtained by varying the LPP shift and the LPP depth, for each embossed space of 3 T to 11 T and 14 T. Namely, the LPP signal level which is obtained at the length of each embossed pit of 3 T to 11 T and 14 T is classified into an area 14a (0 to 0.05), an area 14b (0.05 to 0.1), an area 14c (0.1 to 0.15), an area 14d (0.15 to 0.2), an area 14e (0.2 to 0.25), an area 14f (0.25 to 0.3) and an area 14g (0.3 to 0.35), and the values in these areas are shown by the contour maps. For convenience of the illustration, the reference numerals 14a to 14g indicating the areas are shown only for the embossed space lengths of 3 T and 14 T.

FIG. 12 is a group of the contour maps showing the variations of the RF signal distortion quantity which is obtained by varying the LPP shift and the LPP depth, for each embossed space length of 3 T to 11 T and 14 T. Namely, the RF signal distortion quantity which is obtained at the length of each embossed space of 3 T to 11 T and 14 T are classified into an area 16a (−0.14 to −0.12), an area 16b (−0.12 to −0.1), an area 16c (−0.1 to −0.08), an area 16d (−0.08 to −0.06), an area 16e (−0.06 to −0.04), an area 16f (−0.04 to −0.02), an area 16g (−0.02 to 0), an area 16h (0 to 0.02) and an area 16i (0.02 to 0.04), and the values in these areas are shown by the contour maps. For convenience of the illustration, the reference numerals 16a to 16i indicating the areas are shown only for the lengths of the embossed space lengths of 3 T and 14 T.

With reference to FIG. 9 to FIG. 12, as to each embossed pit length and the embossed space length, it is clear that, if the LPP shift and the LPP depth are varied, the LPP signal level and the RF signal distortion quantity are varied. Therefore, if the LPP shift and the LPP depth are optimized so that the desired LPP signal level is obtained and the RF signal distortion becomes zero, the interference between the embossed pit or the embossed space and the LPP can be obviously prevented even though the LPP is formed in the readable embossed area.

Next, the preferred example of the optimization will be explained. As described above, the LPP shift and the LPP depth serve as the parameters which affect the LPP signal level and the RF signal distortion. Since the LPP shift indicates the length in the disc radial direction of the LPP formed on the land track L (see. FIG. 5), the LPP may affect reading-out of the pit on the neighboring groove track G, which is the uppermost groove track G in FIG. 5, if the LPP shift is long enough to be close to the land track width. In order to eliminate such an effect, it is preferred that the LPP shift is small. Therefore, in this example, the LPP shift is fixed to be smaller than half of the land track width, e.g., 0.16 μm, and the desired LPP signal level and RF signal distortion quantity is realized by varying the LPP depth, which is the other parameter.

Figures 13A, 13B:
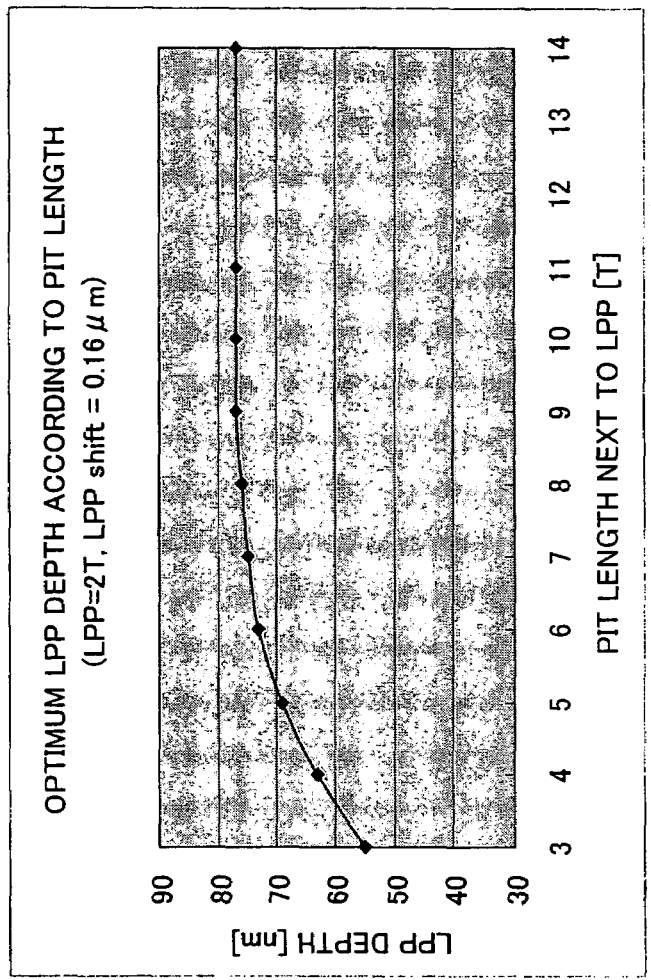
FIGS. 13A and 13B show an optimum LPP depth and an LPP signal level at this moment in a case that an LPP is formed neighboring an embossed pit with fixing an LPP shift.

FIGS. 13A and 13B show the LPP depth which makes the RF signal distortion quantity to be zero, and the LPP signal level at that time under the condition that the LPP shift is fixed to 0.16 μm, in the case that the LPP is formed neighboring the embossed pit. FIG. 13A indicates a numerical value of each embossed pit length (3 T to 11 T and 14 T), and FIG. 13B indicates the numerical values of FIG. 13A in the graph, whose horizontal axis indicates the embossed pit length, and whose vertical axis indicates the LPP depth.

The method of determining the values shown in FIG. 13A, which is in the case that the LPP is formed neighboring the embossed pit, will be explained in detail with reference to FIG. 9 and FIG. 10. Since the LPP shift is fixed to 0.16 μm, the value of the LPP depth at which the RF signal distortion quantity becomes zero when the LPP shift is 0.16 μm is searched for on the contour map of the length of each embossed pit shown in FIG. 10. In FIG. 10, since the RF signal distortion quantity is almost zero on the border between the area 12b (the RF signal distortion quantity is −0.02 to 0) and the area 12c (the RF signal distortion quantity is 0 to 0.02), the LPP depth at the point at which the LPP shift is 0.16 μm on the border between the areas 12b and 12c should be obtained. The work is performed for all the embossed pit lengths shown in FIG. 10, and the value of the LPP depth (55, 63, . . . , 77) shown in FIG. 13A are obtained. FIG. 13B is the graph showing the LPP depth, which is obtained in that way, at each embossed pit length.

Next, the LPP signal levels at the intersection of the LPP depth thus obtained and the LPP shift fixed to 0.16 µm, which are obtained in for each embossed pit length by utilizing FIG. 9 as described above, are 0.096, 0.095, . . . , 0.090 as shown in FIG. 13A. The values of these LPP signal levels are almost within a tolerance for the purpose of detecting whether the LPP exists or not.

In that way, if the LPP depth is optimized at each embossed pit length as shown in FIG. 13B, the RF signal distortion can be maintained at zero and the LPP signal level can be maintained at the level at which the LPP detection is not affected, even though the LPP shift is fixed to 0.16 µm. Therefore, by forming each embossed pit with the LPP depth shown in FIG. 13B, the LPP can be formed in the readable embossed area without the interference between the embossed pit and the LPP.

Figures 14A, 14B:
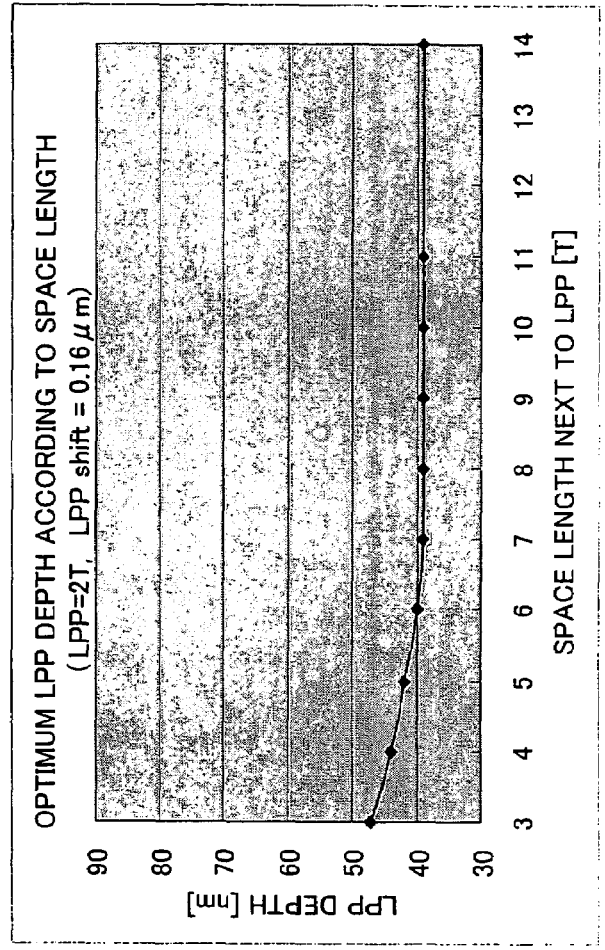
FIGS. 14A and 14B show an optimum LPP depth and an LPP signal level at this moment in a case that an LPP is formed neighboring an embossed space with fixing an LPP shift.

FIGS. 14A and 14B show the result of search for the optimum LPP depth in the identical way by utilizing FIG. 11 and FIG. 12. Namely, the column of the "LPP depth" in FIG. 14A and the graph in 14B show the searched LPP depth when the RF signal distortion quantity becomes zero with the LPP shift fixed to 0.16 µm in FIG. 12. The column of the "LPP level" in FIG. 14A shows the LPP signal levels in the LPP depth thereof, which are searched and found with reference to FIG. 11. These LPP signal levels (0.95, 0.99, . . . , 0.110) may also be within the tolerance in detecting the LPP.

Consequently, if the LPP shift is fixed to 0.16 µm and the LPP depth is optimized according to each embossed space length as shown in FIG. 14B, the interference between the LPP and the embossed space can be prevented even in a case that the LPP is formed neighboring the embossed space in the readable embossed area.

In this example, since the variation of the LPP signal level due to the embossed pit length and the space length is small and the range is between 0.090 and 0.110, the LPP detection effectively becomes easy.

Though the LPP shift is fixed to 0.16 µm in the above embodiment, the LPP depth may be naturally optimized when the LPP shift is fixed to other values. Conversely, the LPP shift can be varied according to the LPP depth fixed. Further, it is possible that the RF signal distortion quantity maintains zero and the LPP signal level completely coincides with each pit length or each space length by simultaneously optimizing both values of the LPP shift and the LPP depth. What technique is to be chosen should be determined dependently on precision of a cutting device in actually cutting the embossed pit and the embossed space on the disc, and possibility of such control.

As explained above, in forming the LPP in the readable embossed area, the interference between the embossed pit or the embossed space and the LPP can be prevented by optimizing the LPP shift and the LPP depth according to the embossed pit length or the embossed space length. Therefore, the unreadable embossed area is not needed only for the purpose of the LPP detection. Consequently, there are only two kinds of areas having different depths in a single disc, and the preferred push-pull signal and DPD signal level can be obtained easily. So, the cutting in forming a disc-stamper becomes very easy.

Since the unreadable embossed area does not have to be formed in each ROM area in a case that the ROM area is formed on the DVD-RW disc, disc capacity is not used in vain. The above method can be applied to a case that control data on the DVD-R disc is formed in a form of readable embossed shapes, instead of a pre-writing it.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2002-320706 filed on Nov. 5, 2002 including the specification, claims, drawings and summary is incorporated herein by reference in its entirety.

What is claimed is:

1. An information recording medium on which groove tracks, land tracks neighboring the groove tracks and land prepits on the land tracks are formed,
    wherein the groove comprises an embossed area in which an embossed configuration including pits and spaces of predetermined depths is formed; and
    wherein the land prepit in the embossed area has an optimized configuration according to a length of the pit or the space which is in the embossed area and which the land prepit neighbors.

2. The information recording medium according to claim 1, wherein the optimized configuration is prescribed by a prepit shift which indicates a length of the land prepit in a perpendicular direction to a direction of the length of the groove track and by a depth of the land prepit.

3. The information recording medium according to claim 2, wherein the prepit shift is determined to be constant for all the lengths of the pit or the space in the embossed area; and wherein the depth of the prepit is determined according to the length of the pit or the space in the embossed area.

4. The information recording medium according to claim 1, wherein the optimized configuration of the land prepit is a configuration with which an RF signal distortion caused by the prepit becomes minimum.

* * * * *